United States Patent
Guest et al.

(10) Patent No.: US 11,546,141 B1
(45) Date of Patent: Jan. 3, 2023

(54) CRYPTOGRAPHIC PROTECTION FOR PORTIONS OF MEDIA

(71) Applicant: Amazon Technologies, Inc., Seattle, WA (US)

(72) Inventors: Simon Guest, Kirkland, WA (US); Amit Adam, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 17 days.

(21) Appl. No.: 17/209,652

(22) Filed: Mar. 23, 2021

(51) Int. Cl.
| | |
|---|---|
| *H04L 9/08* | (2006.01) |
| *G06F 21/60* | (2013.01) |
| *H04L 9/06* | (2006.01) |
| *G06V 20/10* | (2022.01) |
| *G06V 10/40* | (2022.01) |

(52) U.S. Cl.
CPC .......... *H04L 9/0825* (2013.01); *G06F 21/602* (2013.01); *G06V 10/40* (2022.01); *G06V 20/10* (2022.01); *H04L 9/0618* (2013.01)

(58) Field of Classification Search
CPC ... H04L 9/0825; H04L 9/0618; G06F 21/602; G06V 10/40
See application file for complete search history.

(56) References Cited

U.S. PATENT DOCUMENTS

| | | | | |
|---|---|---|---|---|
| 10,044,509 | B1* | 8/2018 | Kirshner | ............... H04L 63/045 |
| 2013/0156185 | A1* | 6/2013 | Kim | ................. G08B 13/19686 |
| | | | | 380/210 |
| 2014/0226814 | A1* | 8/2014 | Fernando | ........... H04N 21/2347 |
| | | | | 380/200 |
| 2018/0005016 | A1* | 1/2018 | Nakashima | ............ G06V 10/96 |
| 2018/0046814 | A1* | 2/2018 | Manoharan | ............. G06F 21/62 |
| 2019/0028441 | A1* | 1/2019 | Thakkar | ............. H04N 21/4405 |
| 2021/0152530 | A1* | 5/2021 | Nair | ........................ G06V 20/41 |
| 2022/0109556 | A1* | 4/2022 | Takatsuka | ............. H04L 9/0869 |

OTHER PUBLICATIONS

Gary, C. Kessler, "An Overview of Cryptography", Nov. 17, 2006, Retrieved from the Internet: <URL:https://www.cs.princeton.edu/~chazelle/courses/BIB/overview-crypto.pdf> (Year: 2006).*

* cited by examiner

*Primary Examiner* — Philip J Chea
*Assistant Examiner* — Sangseok Park
(74) *Attorney, Agent, or Firm* — Kilpatrick Townsend & Stockton LLP (57) ABSTRACT

Techniques for cryptographically protecting personally identifiable information in images and videos are described herein. An image may be obtained. One or more regions in the image may be detected based on an object detection algorithm. Pixels for each region of the one or more regions may be encrypted using a symmetric encryption technique and an initialization vector. The encrypted pixels for each region of the one or more regions may be written back into the image. A symmetric key of the symmetric encryption technique and the initialization vector may be encrypted using an asymmetric encryption technique. Metadata of the image may be updated to store the encrypted symmetric key and the encrypted initialization vector.

15 Claims, 8 Drawing Sheets

CRYPTOGRAPHIC PROTECTION FOR PORTIONS OF MEDIA

BACKGROUND

With more devices capturing information about users, such as passwords, birthdates, social security numbers, etc., digital data security is of paramount importance. A number of policies exist to limit how such data about users is collected, stored, and shared in an attempt to protect this sensitive information and prevent data breaches. Despite the policies and procedures put in place by organizations which handle or capture such data, data breaches continue to occur. To compact the problem various entities utilize procedures which capture tangent data, such as images of people or places, to train machine learning algorithms for various purposes that have nothing to do with the identities of the people or places captured in the image. For example, training a machine learning algorithm to identify stop signs in a street may involve capturing images of streets which may include cars and pedestrians. Conventional protection mechanisms may make such images incapable of being used to train a machine learning algorithm upon utilizing conventional protection mechanisms which scrub the images of personally identifiable information.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a cryptographic protection feature for encrypting certain regions of an image or video to protect personally identifiable information (PII) in a reversible manner. The cryptographic protection feature may be implemented by a service provider computer which captures or otherwise obtains images or video which include certain regions or portions that include PII. For example, a camera system may capture images and video of candid motion at one or more locations, and the video may coincidentally include faces of passersby or the like. To protect the PII included in captured or otherwise obtained images and video, certain portions of the images and video which contain PII (e.g., faces, name tags, badges, etc.) may be encrypted and written back into the image or video in the encrypted form. The cryptographic protection feature may utilize a combinatory symmetric and asymmetric cryptographic technique for detecting PII in an image or video, encrypting the PII, and writing the encrypted PII back into the original image or video.

In a non-limiting example, a camera system may capture images of an area which may include people. The camera system may be associated with a delivery vehicle or it may be a security camera or any suitable camera that is mounted to a surface and configured to capture images. Although the non-limiting example describes a scenario including a camera system of a delivery vehicle, embodiments disclosed herein are not limited to such scenarios. The cryptographic protection feature described herein may provide early detection and protection of PII captured by any suitable camera or video system. The captured images may be utilized to detect weather conditions proximate to a delivery vehicle and update delivery routes for the delivery vehicle or to train a machine learning algorithm to detect weather conditions. However, included in the captured images are several people walking by the delivery vehicle. A computer system implementing the cryptographic protection feature may be configured to detect PII in the images (e.g., the faces of the people included in the captured images) and utilize the combinatory protection technique to encrypt the PII. The PII may be detected in the images, encrypted using a symmetric encryption technique and an initialization vector, and the encrypted pixels may be written back into the original image thereby protecting the PII. The cryptographic protection feature described herein may utilize an asymmetric encryption technique to further encrypt the encryption key used to encrypt the PII detected pixels and initialization vector. The computer system may be configured to modify metadata of the image to store the encrypted encryption key and the initialization vector. The computer system may be configured to transmit the encrypted image and associated metadata to a server computer via one or more networks.

By utilizing such a process should a malicious actor obtain the encrypted image and the associated metadata they would be unable to decrypt the encrypted PII included in the image. In order for a malicious actor to decrypt the PII they would need access to the private key which corresponds to the public key used in the asymmetric encryption technique. However, the private key may be stored in a remote and secure location separate from the computer system to prevent such access and results in ultimately protecting the PII detected in the image. Although this example describes a scenario in which images or video are captured by a camera system of a delivery vehicle (e.g., motor vehicle, drone, autonomous mobile robot or mobile robot, mobile device or computer system worn, attached, or otherwise held by a human operator), the embodiments disclosed herein are not limited to such scenarios. The cryptographic protection features may be utilized to detect and protect PII in images or video from a variety of sources captured during a multitude of scenarios. For example, the disclosed techniques could be used to protect any portions of any images or video captured by any type of camera, in essentially any scenario, and could also be used to obscure or otherwise protect any portions of these images or video, not just PII.

In embodiments, the service provider computers implementing the cryptographic protection feature may be utilized to protect PII detected in images or video as a video may be analyzed frame by frame where each frame corresponds to an image. "Image" may be utilized throughout the disclosure to refer to images or video analyzed at a frame by frame granularity. In accordance with at least one embodiment, the service provider computers implementing the cryptographic protection feature may utilize an object detection algorithm to detect the PII which will generate the X and Y coordinates of the pixels in a captured image which correspond to the PII as well as an order of detection for the PII in the image. In embodiments, the service provider computers may utilize one or more object detection algorithms where each object detection algorithm is configured to detect a different type of object (e.g., one algorithm may be configured to detect faces of people while another algorithm may be configured to detect license plates of vehicles). In accordance with at least one embodiment, the service provider computers may utilize a different encryption key, initialization vector, and public-private key pair for the cryptographic protection feature to protect PII that corresponds to different types of objects detected as PII. For example, a first set of an encryption key and an initialization vector may be used to encrypt the pixels which correspond to detected faces in an image. The first set of the encryption key and the initialization vector may be further encrypted using a first public-private asymmetric key pair and stored in the metadata of the image. A second, and different, set of encryption key and initialization vector may be used to encrypt the pixels which correspond to detected license plates in the same image. The second set of the encryption key and the initialization vector may be further encrypted using a second public-private asymmetric key pair that is also stored in the metadata of the same image.

The cryptographic protection feature may not only be used to encrypt PII detected in images but also to decrypt PII that is encrypted in an image. In accordance with at least one embodiment, the service provider computers implementing the cryptographic protection feature may be configured to receive an image with one or more encrypted portions which correspond to less than the entirety of the image and corresponding metadata. The service provider computers may be configured to extract from the metadata of an encrypted image an encrypted encryption key used to encrypt the encrypted portion of the image using the symmetric encryption technique, an encrypted initialization vector, and coordinates for the pixels which correspond to the encrypted portions in the image. The service provider computers may maintain or access the private key which corresponds to the public key used to initially encrypt the encryption key and the initialization vector. In embodiments, the service provider computers may utilize the decrypted encryption key and the initialization vector to decrypt the encrypted pixels and write the decrypted pixels back into the image. As described herein, the service provider computers may maintain or access one or more different private keys to decrypt encryption keys used to encrypt pixels in an image which correspond to different types of detected objects in the image by the one or more object detection algorithms.

Conventional PII protection mechanisms may utilize a blurring technique for an entirety of an image which renders the image unusable for any purpose. Conventional PII protection mechanisms which may even detect only certain portions of an image to blur still face the problem that blurring techniques are a one way process which cannot be undone. Moreover, conventional PII protection mechanisms which utilize such blurring techniques may alleviate such issues by maintaining two version of the same image—an original or raw data image which is unprotected and a blurred image which protects any PII included in the image. However, such conventional protection mechanisms are more prone to security breaches as a malicious actor only needs to acquire the raw data image to gain access to the PII. Additionally, such conventional protection mechanisms result in higher overhead as storage for two versions of each image must be obtained. Blurred images are also not as useful for training machine learning algorithms as machine learning algorithms which are trained using images with blurred portions may be less accurate than machine learning algorithms which are trained with raw image data.

The methods and systems described herein provide several advantages over conventional protection mechanisms. For example, the cryptographic protection feature described herein generates a single encrypted image that is protected with a combinatory approach that results in malicious actors being unable to access the PII of an image. For example, even if a malicious actor were to obtain the image and associated metadata they would be unable to access the PII encrypted in the image as they lack access to the private key for the asymmetric portion of the combinatory approach. Machine learning algorithms can be trained using the decrypted version of the image without giving access to a user or entity such as an associated data scientist as the server or computer implementing the machine learning algorithm can be granted access to the private key without the data scientist needing to see the raw image data. The cryptographic protection feature described herein can also be performed immediately upon capture of the image at the capture point (e.g., if captured by a delivery vehicle, a computer system of the delivery vehicle can be configured to detect and encrypt the PII immediately upon capture). Conventional protection mechanisms may store raw unprotected images for a period before transmitting the unprotected images to another computer system for blurring processes. The cryptographic protection features described herein also result in less storage overhead as only one version of the image needs to be generated as the encrypted pixels are written back into the image and the asymmetrically protected encryption key and initialization vector can be stored in the metadata of the image. It should be noted that the cryptographic protection features described herein may store an encrypted symmetric key and an encrypted initialization vector as well as other information in the metadata of an image as well as a metadata file associated with an image or a metadata file that is independent of a corresponding image file.

Figure 1:
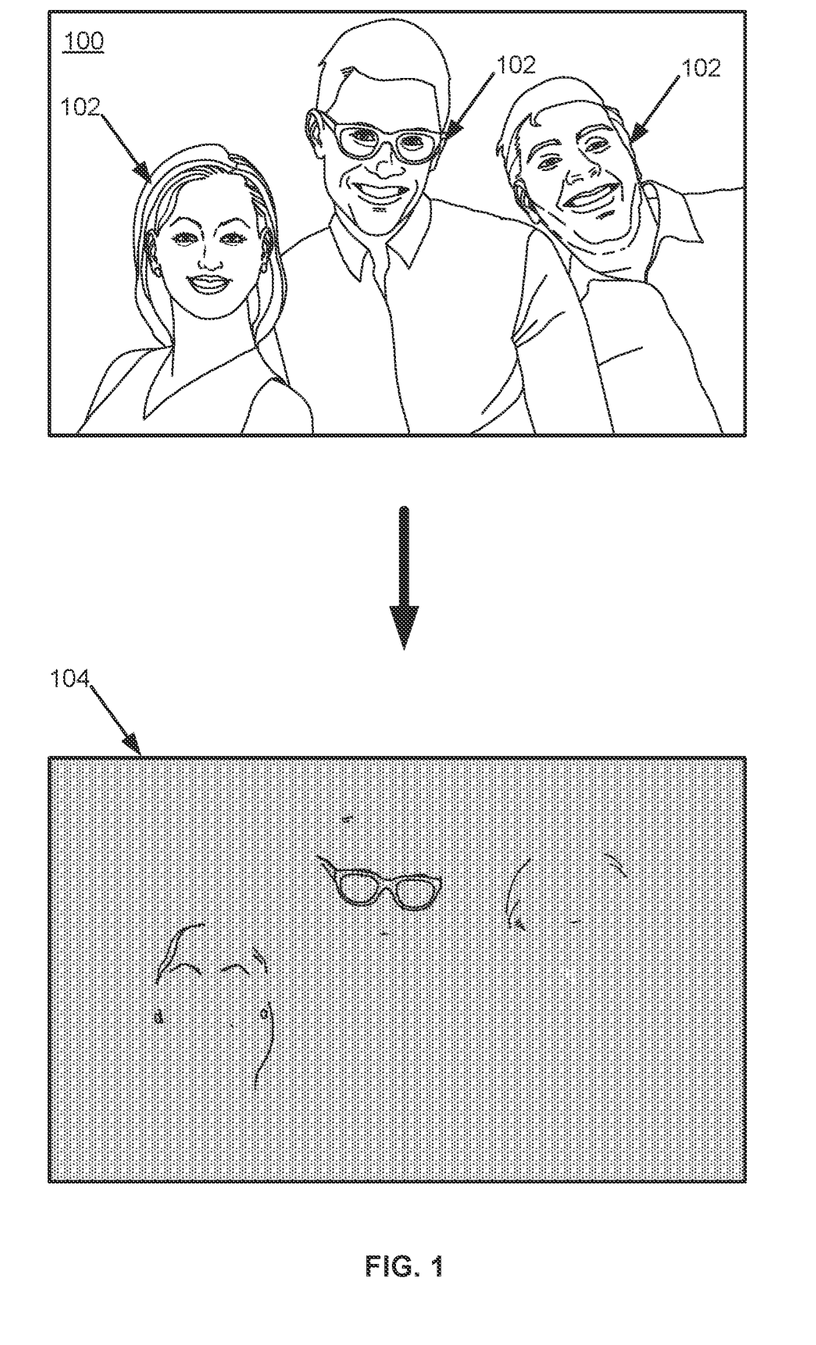
FIG. 1 illustrates a conventional process for protecting personally identifiable information.

FIG. 1 illustrates a conventional process for protecting personally identifiable information. FIG. 1 depicts an image 100 without any protection of PII included in the image. An image similar to image 100 without any protection of PII may be referred to as raw image data and refers to how an image would look like without any PII protection mechanisms applied. The image 100 may include PII such as the people's faces 102. PII can include more than a person's face captured in an image as it could include a person's likeness, body, markings on a body such as tattoos, or it may include identifiable information that can be obtained from inanimate objects such as images captured of license plates.

As described herein, conventional protection mechanisms may utilize a blurring process that blurs an entire image 104 to protect PII included in the image. However, a blurring process which obscures the details included in the image is a one way process and can't be undone. This results in any PII included in the image being protected but also leaves other details in the image which are not PII unusable. Conventional protection mechanisms may blur only regions or portions of image 100 which include PII 102 yet this also creates problems (e.g., the blurring may be applied only to regions of interest such as the faces 102 in image 100). As mentioned above, systems may store two versions of the same image (e.g., unprotected image 100 as well as blurred image 104) for subsequent analysis by systems or users. This can result in greater storage overhead and overall less protection as an unprotected image (100) is still stored or maintained with PII visible. Storage overhead and security issues only increase when dealing with video as each frame of a video is treated as an image. Machine learning algorithms or classifiers which utilize blurred images to train with are inaccurate as they incorporate or don't know how to classify blurred regions of an image.

Figure 2:
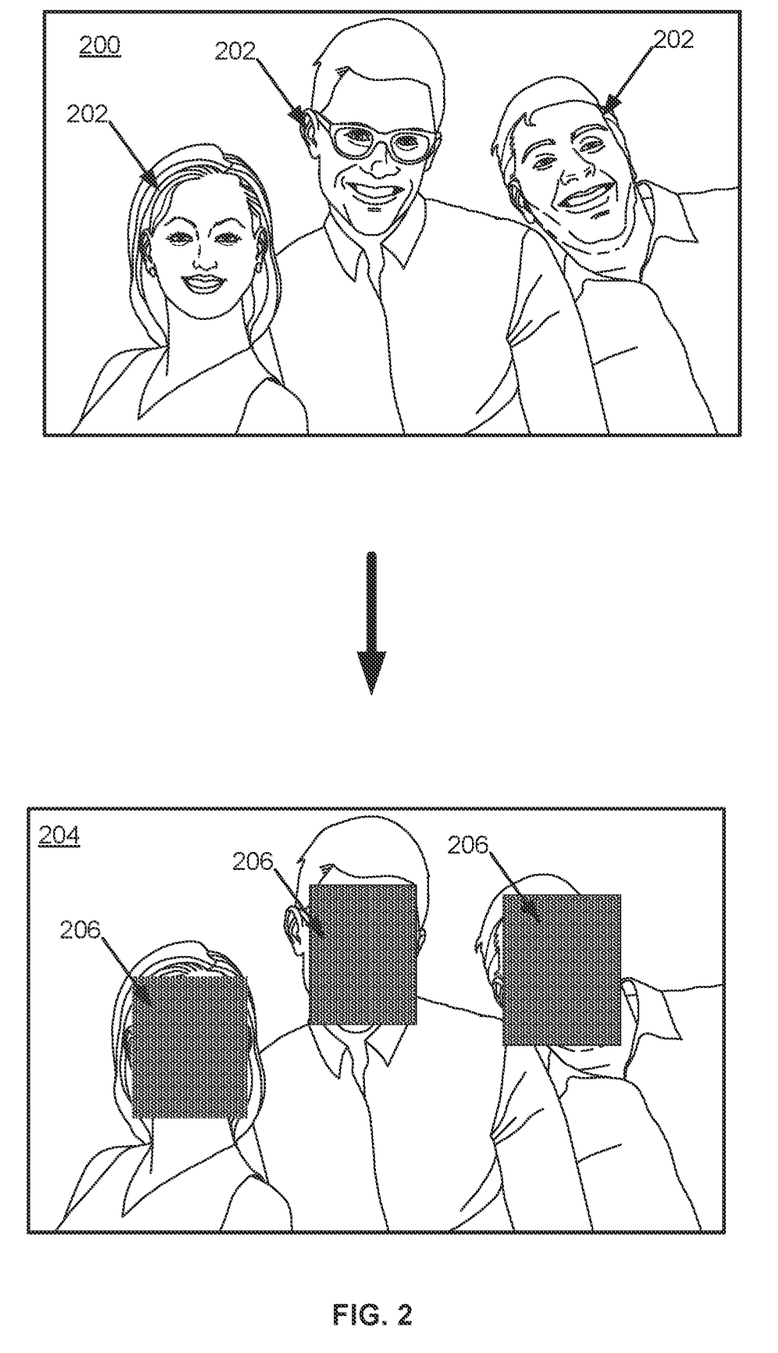
FIG. 2 illustrates an example process corresponding to a cryptographic protection feature for protecting personally identifiable information, in accordance with at least one embodiment.

FIG. 2 illustrates an example process corresponding to a cryptographic protection feature for protecting personally identifiable information, in accordance with at least one embodiment. FIG. 2 depicts an image 200 without any protection mechanisms applied to the image (e.g., raw image data). The image 200 may include several pieces of PII such as faces 202. The cryptographic protection feature described herein may identify the PII 202 using one or more object detection algorithms to analyze images captured by a capture device, camera, or computer system. The one or more object detection algorithms may each be configured to detect different types of objects which correspond to different types of PII (e.g., faces, tattoos, license plates, etc.). In embodiments, the one or more object detection algorithms may identify the regions or portions of image 200 which correspond to the PII 202 such as by determining the pixels of image 200 which correspond to PII 202. This can result in generating a bounding box, area, region of interest, or portion of image 200 as identified by pixels which correspond to an object detected by the object detection algorithm(s) that correspond to PII 202. In embodiments, the object detection algorithms may also generate an order of identification or sequence of identification for the objects (PII 202) identified in the image 200.

FIG. 2 also depicts image 204 which illustrates the application of the cryptographic protection features described herein by encrypting the pixels which correspond to the PII 202 resulting in protected PII 206. The cryptographic protection feature implemented by the service provider computers and/or a computer system associated with a camera such as an image signal processor may utilize a combinatory approach of a symmetric encryption technique and an asymmetric encryption technique. By utilizing such a combinatory approach, the protected PII 206 can be reversed (e.g., decrypted) and result in an overall more secure and optimized protection of the PII 202 for image 200 and 204. Encryption, as used herein, can refer to a cryptography process for encoding information, such as pixels in an image, into an unreadable format. Decryption, as used herein, can refer to a cryptography process for converting encrypted information or data, such as encrypted pixels, into its original form. A symmetric encryption technique can refer to a symmetric key algorithm which utilizes the same cryptographic key for both the encryption and decryption of data. In the current disclosure the cryptographic key for the symmetric encryption technique may be referred to as an encryption key. In accordance with at least one embodiment, the service provider computers may utilize a block cipher symmetric encryption technique and an initialization vector to chain multiple block cipher passes of the block cipher symmetric encryption technique together to encrypt the pixels which correspond to PII detected by the object detection algorithms. An asymmetric encryption technique can refer to a cryptographic system which uses a pair of keys, e.g., a public key and a private key. The public key of the asymmetric encryption technique may be used to encrypt data or information which cannot be decrypted with the same public key. Instead, the private key of the pair of keys is used to decrypt the encrypted data or information encrypted by the public key of the public-private key pair.

In accordance with at least one embodiment, the service provider computers may utilize a symmetric encryption technique and an initialization vector to encrypt the pixels which correspond to detected PII 206 as detected by the object detection algorithm. In embodiments, the service provider computers may then write the encrypted pixels back into the image resulting in image 204 as depicted in FIG. 2. It should be noted that although FIG. 2 depicts a bounding box or area which covers most of the features of faces which correspond to protected PII 206, the cryptographic protection features described herein may encrypt, and thereby protect, more or less of an area which corresponds to a detected object. For example, depending on the object detection algorithm more or less of an area of an image which corresponds to PII may be obscured via encryption. For example, a certain type of object detection algorithm which detects license plates as PII which needs to be encrypted may result in encrypting pixels which correspond to only the numbers, state, and other identifying information of the license plate in an image. Whereas an object detection algorithm which detects faces of people in an image may result in encrypting pixels which extend beyond the area of an image which corresponds to a face to ensure a level of greater protection for certain types of PII compared to other types of PII. Utilized in the combinatory approach of the cryptographic protection feature described herein.

In accordance with at least one embodiment, the cryptographic protection feature utilizes an asymmetric encryption technique as part of the combinatory approach to protect detected PII in an image. The asymmetric encryption technique implemented by the service provider computers may encrypt the encryption key of the symmetric encryption technique and the initialization vector using a public key of a public-private key pair. In embodiments, the encrypted encryption key and initialization vector may be stored in metadata associated with image 204. In accordance with at least one embodiment, the X and Y coordinates of the pixels which correspond to the objects detected in the image (e.g., 206 of image 204) as well as the sequence of detection or order of detection generated by the object detection algorithm may be stored in the metadata as well. The private key of the public-private key pair which corresponds to the asymmetric encryption technique is stored or maintained in a secure and separate area which may include a different computer device, such as a server computer in communication with a computer system via one or more networks, or other secure location.

By storing the private key in a separate location or in a secure portion of a computer system the encrypted PII (206)

of image 204 is protected in situations where a malicious actor obtains the image 204 and the corresponding metadata. The malicious actor would require the private key of the asymmetric encryption technique to decrypt the encryption key and initialization vector of the symmetric encryption technique used to encrypt and protect PII 206 of image 204. Moreover, only one version of an image need to generated (e.g., the raw image that is captured and processed has the encrypted pixels written back into the image) thereby reducing storage overhead. In embodiments, the cryptographic protection feature includes decrypting the protected PII 206 of image 204 using the private key of the asymmetric encryption technique thereby restoring an image to the raw image (e.g., 204 decrypted back to 200). In accordance with at least one embodiment, the service provider computer may be configured to extract the encrypted encryption key and initialization vector as well as coordinates for pixels which correspond to the encrypted portions of an image (such as 206 of 204) from associated metadata of the image.

The service provider computers may be configured to decrypt the protected PII 206 by decrypting the encryption key and initialization vector and then decrypting the pixels which correspond to the protected PII 206 using the symmetric encryption technique. The service provider computers may decrypt the pixels corresponding to protected PII 206 in a certain order or sequence as indicated by the information included in the metadata. For example, the service provider computers may decrypt the PII 206 in a reverse order of detection as indicated by the metadata. In embodiments, the service provider computers may be configured to write the decrypted pixels back into the same image resulting in a restoration of image 200 from image 204 using the cryptographic protection features described herein. By restoring image 200 from image 204 machine learning algorithms may be trained more accurately and overhead storage of the image 200/204 may be reduced as only one version of the image needs to be maintained.

Figure 3:
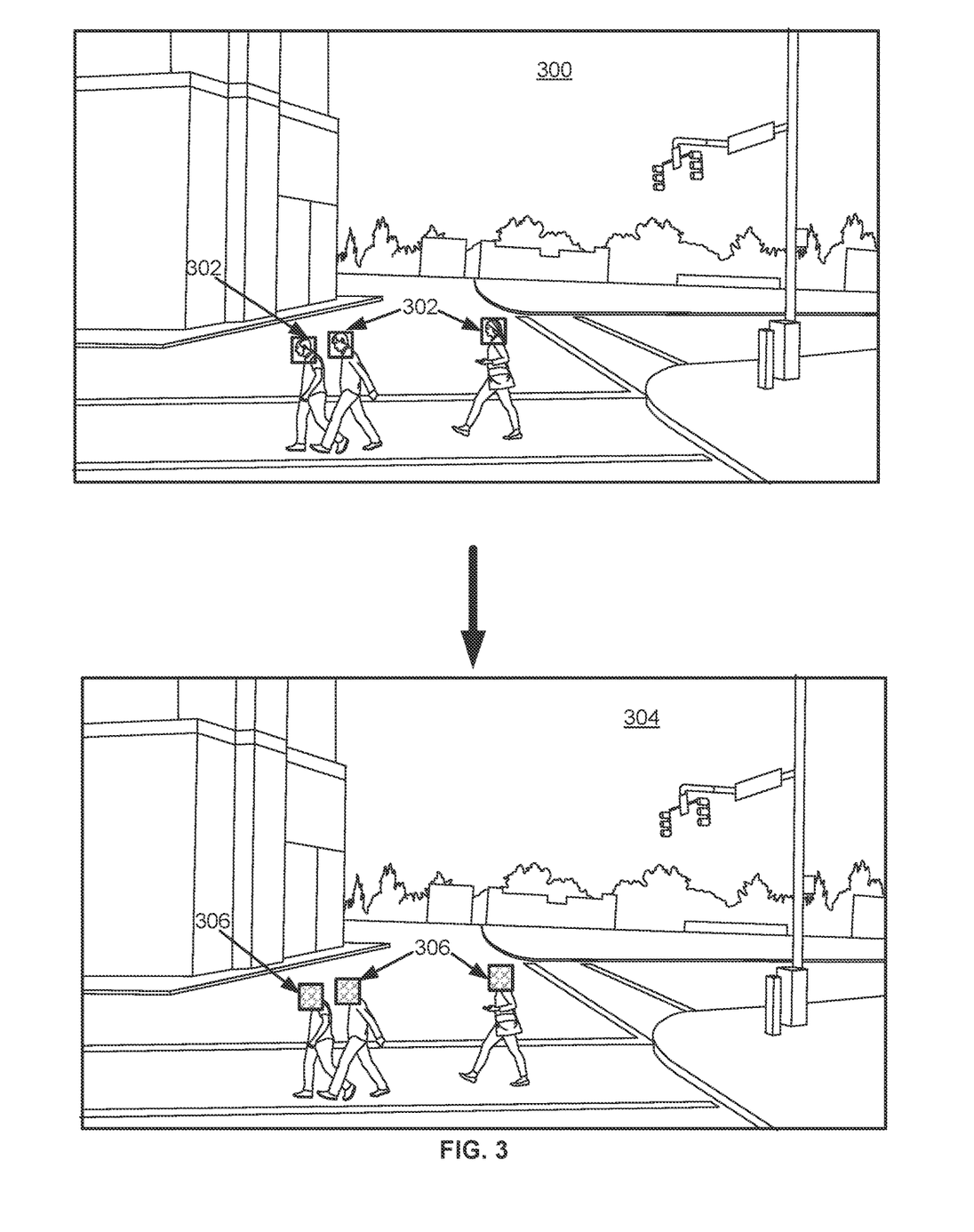
FIG. 3 illustrates an example process corresponding to a cryptographic protection feature for protecting personally identifiable information, in accordance with at least one embodiment.

FIG. 3 illustrates an example process corresponding to a cryptographic protection feature for protecting personally identifiable information, in accordance with at least one embodiment. FIG. 3 includes image 300 which may be another example of an image that includes detected PII 302 similar to image 200 and 202 of FIG. 2. FIG. 3 depicts several people crossing a street and detected PII 302 which corresponds to the people's faces. The image 300 may be captured by a camera system of a vehicle during a delivery route for the purposes of determining traffic conditions. In embodiments, a system analyzing traffic conditions would not need access and would be responsible for protecting the PII 302. Similar to FIG. 2, the service provider computers or computer system associated with the camera capturing image 300 may be configured to detect objects which correspond to PII 302 and encrypt the portions or regions of interest in image 300 to protect PII 302 in a reversible manner.

In accordance with at least one embodiment, the service provider computers may be configured to utilize an object detection algorithm to identify objects in image 300 which correspond to PII 302 and utilize the cryptographic protection features to encrypt the pixels in image 300 which correspond to PII 302. FIG. 3 depicts image 300 transitioned from the raw image to a protected image 304 as PII 302 is now encrypted PII or protected PII 306. As described herein, the service provider computers may utilize a symmetric encryption technique and an initialization vector to encrypt the pixels of image 304 which correspond to PII 302 and write the encrypted pixels back into the image (e.g., 306). The encryption key and the initialization vector of the symmetric encryption technique may be encrypted using a public key of an asymmetric encryption technique.

The encrypted encryption key, initialization vector, and the coordinates of the pixels (X and Y coordinates) within image 302 that correspond to the detected objects (PII 302) may be stored in metadata associated with image 302/304. In embodiments, the image 304 with protected PII 306 may be transitioned back to the raw image 300 and unprotected PII 302 by extracting the encrypted encryption key, initialization vector, and coordinates for the pixels which correspond to protected PII 306 from the associated metadata. A service provider computer implementing the cryptographic protection feature may be configured to utilize a private key which corresponds to the public key used to encrypt the encryption key and initialization vector to decrypt the encryption key and initialization vector. The service provider computer may utilize the encryption key and the initialization vector as well as the extracted coordinates of the pixels for protected PII 306 to decrypt the pixels and write the decrypted pixels back into the image thereby transitioning from image 304 back to image 300.

Figure 4:
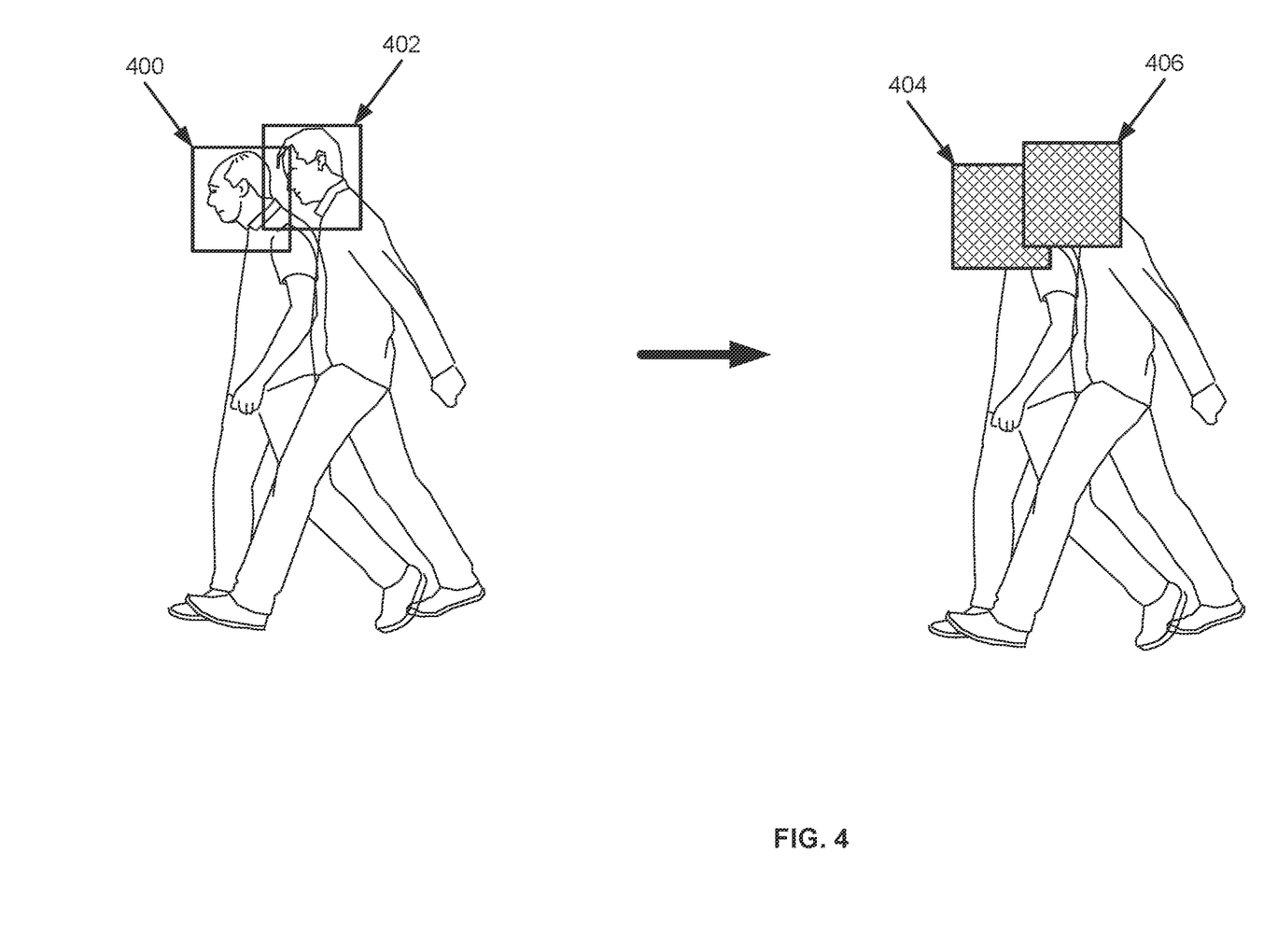
FIG. 4 illustrates an example process corresponding to a cryptographic protection feature for protecting personally identifiable information with overlapping regions, in accordance with at least one embodiment.

FIG. 4 illustrates an example process corresponding to a cryptographic protection feature for protecting personally identifiable information with overlapping regions, in accordance with at least one embodiment. FIG. 4 depicts a scenario where PII objects 400 and 402 are detected in such a way that the regions of interest or pixels which correspond to the PII objects 400 and 402 overlap or otherwise intersect. Conventional protection mechanism may fail to accurately detect and protect PII in such scenarios. However, the cryptographic protection feature described herein may utilize the combinatory cryptographic methods to properly detect and protect PII in images with similar scenarios. For example, the service provider computers may utilize an object detection algorithm to detect objects which correspond to PII (e.g., the faces of the people depicted in FIG. 4).

The implemented object detection algorithm may be configured to identify the X and Y coordinates for pixels which correspond to 400 and 402 as well as an order or sequence of identification for PII objects 400 and 402. The cryptographic protection feature may encrypt, for example, the pixels which correspond to PII object 400 using the symmetric encryption technique described herein and an initialization vector based on the order of detection from the object detection algorithm indicating that PII object 400 is detected first in an image. This would result in some of the pixels from PII object 402 being encrypted. As the system subsequently encrypts the pixels which correspond to PII object 402, the already encrypted pixels (e.g., a portion of the pixels) may be encrypted again using the symmetric encryption technique and an initialization vector. The encrypted pixels may be written back into the image thereby transitioning the image to include encrypted PII 404 and 406 of FIG. 4. As described herein the encryption key and initialization vector may be encrypted using a public key of a public-private key pair of an asymmetric encryption technique to encrypt the encryption key and initialization vector. The encrypted encryption key and the initialization vector may be stored in the metadata of the image. In embodiments, the decryption process may account for the overlapping regions of 400/402 and 404/406 by utilizing the order of identification or sequence from the object detection algorithm. This results in the double encrypted portions which overlap between 404 and 406 being decrypted in a correct order such that the double encryption transitions to a single encryption and then to no encryption thereby restoring the image to the raw image format.

Figure 5:
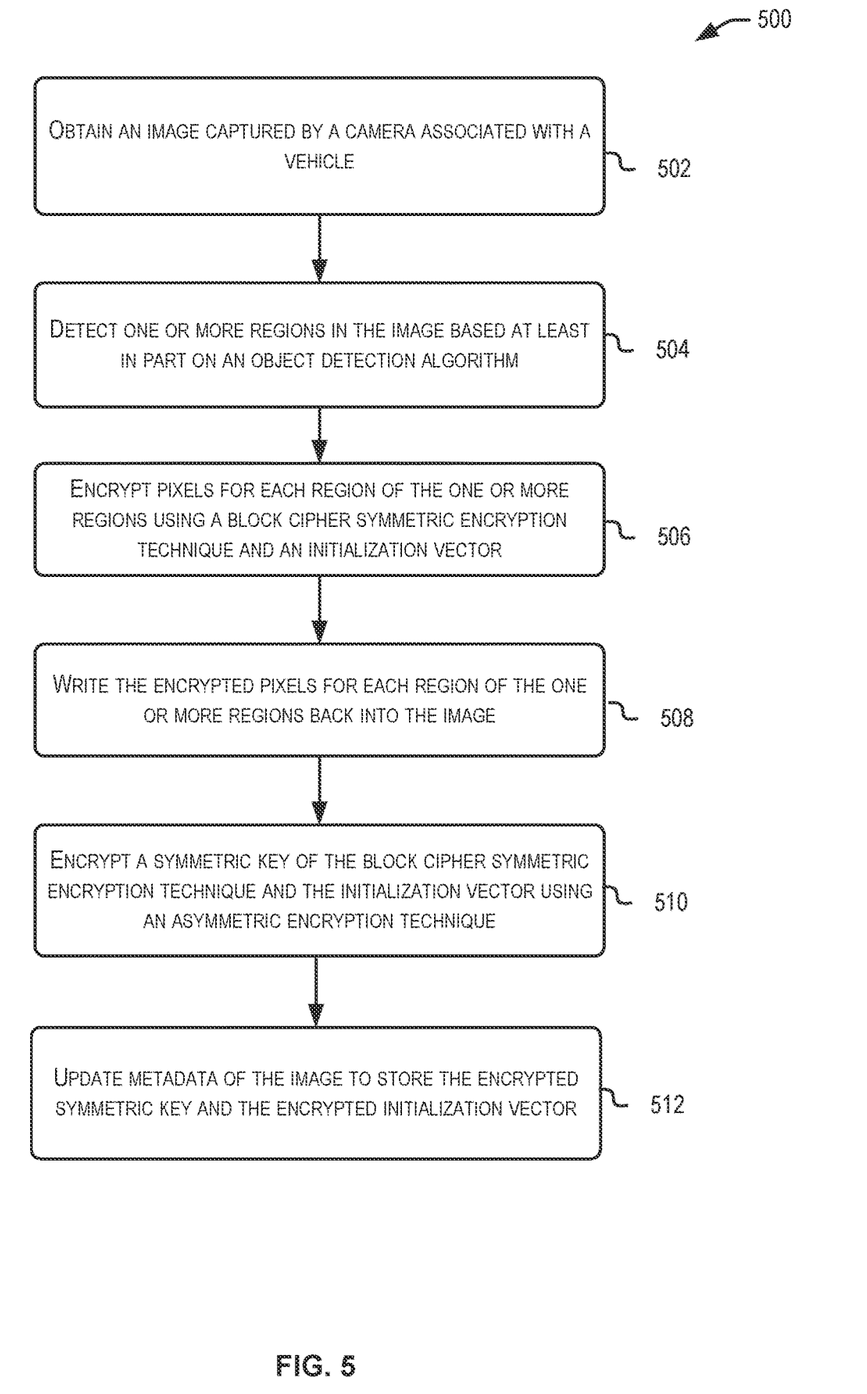
FIG. 5 illustrates an example flow chart for a cryptographic protection feature, in accordance with at least one embodiment.
Figure 6:
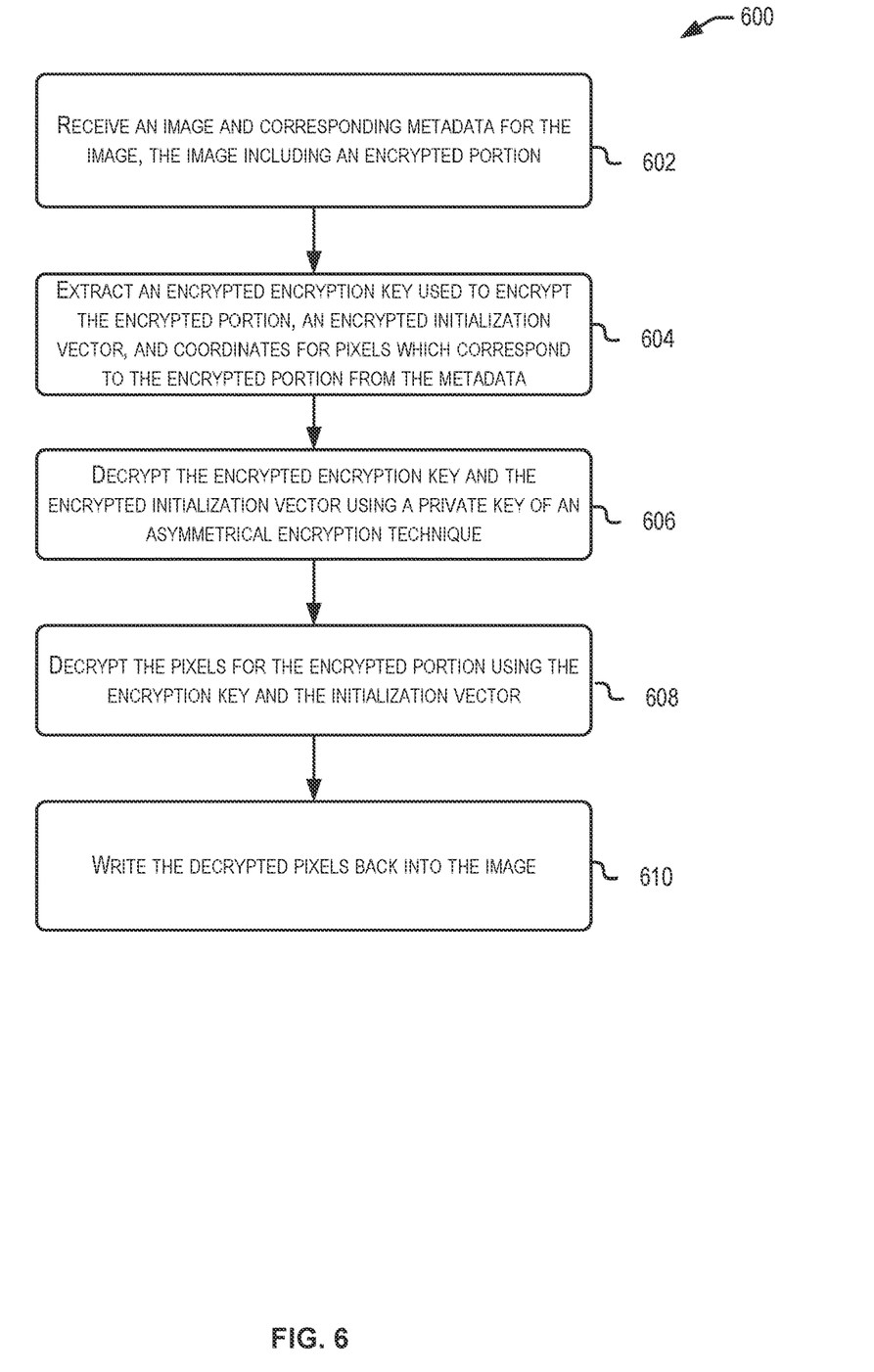
FIG. 6 illustrates an example flow chart for a cryptographic protection feature, in accordance with at least one embodiment.

FIGS. 5 and 6 illustrate example flow charts for a cryptographic protection feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 7:
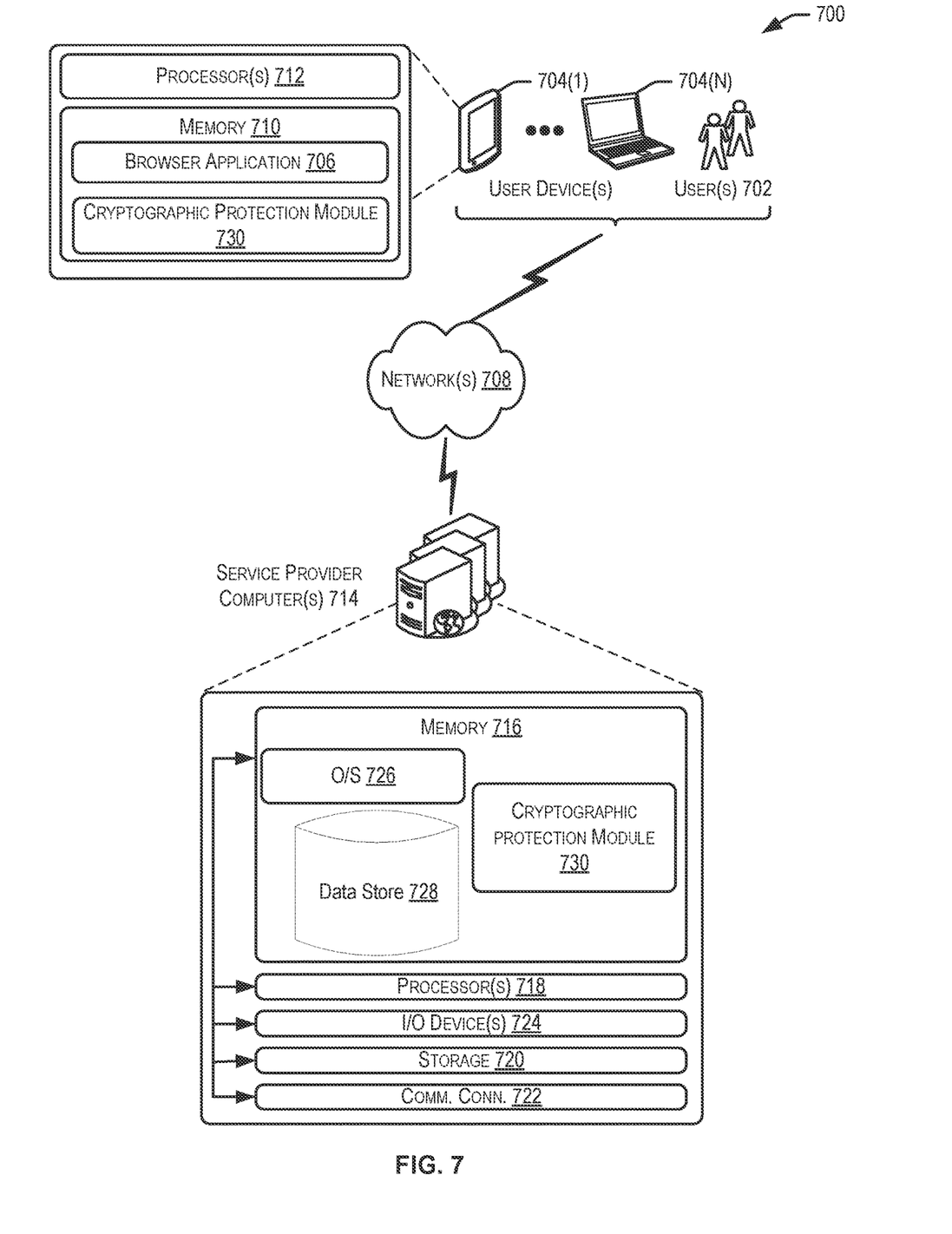
FIG. 7 illustrates an example architecture for implementing a cryptographic protection feature, in accordance with at least one embodiment.

In some examples, service provider computer (service provider computers 714) utilizing at least the cryptographic protection module 730 depicted in FIG. 7 may perform the processes 500 and 600 of FIGS. 5 and 6. In FIG. 5, the process 500 may include obtaining an image captured by a camera associated with a vehicle at 502. In embodiments, the vehicle may include an autonomous mobile drive unit or robot or a drone. The camera may also be associated with, worn, or held by a user or person. The process 500 may include detecting one or more regions in the image based at least in part on an object detection algorithm at 504. In accordance with at least one embodiment, the object detection algorithm may be configured to detect personally identifiable information such as faces of people, license plates of vehicles, or any other suitable personally identifiable information. The service provider computers implementing the cryptographic protection feature may utilize one or more object detection algorithms to detect the personally identifiable information in an image. In embodiments, the service provider computers may receive a video captured by the camera which is then analyzed frame by frame as an image. In accordance with at least one embodiment, the object detection algorithm may be configured to determine the X and Y coordinates of the pixels which correspond to regions in the image or portions in the image that include personally identifiable information as well as the order or sequence of detection in the image by the object detection algorithm.

The process 500 may include encrypting pixels for each region of the one or more regions using a block cipher symmetric encryption technique and an initialization vector at 506. In embodiments, the initialization vector may be a randomly generated number that is used to seed the block cipher symmetric encryption technique. The process 500 may include writing the encrypted pixels for each region of the one or more regions back into the image at 508. In embodiments, by writing the encrypted pixels back into the image the personally identifiable information that was detected in the one or more regions is protected as the data is encrypted and indistinguishable by the human eye or a machine. The process 500 may include encrypting a symmetric key of the block cipher symmetric encryption technique and the initialization vector using an asymmetric encryption technique at 510.

In embodiments, the symmetric key and the initialization vector may be encrypted via the asymmetric encryption technique using a public key that corresponds to a private key that is securely maintained on the one or more service provider computers or on another computer device separate from the device capturing the image and performing the encryption. The process 500 may include updating metadata of the image to store the encrypted symmetric key and the encrypted initialization vector at 512. In accordance with at least one embodiment, the metadata may be updated to store the X and Y coordinates of the pixels for the detected one or more regions as well as the sequence or order of detection by the object detection algorithm. In accordance with at least one embodiment, the metadata and/or the encrypted image may be transmitted to a computer system for storage and subsequent analysis and/or decryption. In accordance with at least one embodiment, an encryption key and initialization vector may be associated with a type of object detected by the object detection algorithm. For example, a first set of an encryption key and initialization vector may be used to encrypt objects in an image which correspond to a person's face while another, different, set of an encryption key and initialization vector may be used to encrypt objects in an image which correspond to license plates of vehicles. In such cases, a different public-private key pair may be used by the service provider computers to encrypt the encryption key and initialization vector such that one private key may be used to decrypt the encryption key and initialization vector for regions which correspond to human faces while another private key may be used to decrypt the encryption key and initialization vector for regions which correspond to license plates.

The process 600 of FIG. 6 may include receiving an image and corresponding metadata for the image where the image includes an encrypted portion at 602. In embodiments, the encrypted portion may be less than an entirety of the image. For example, the image may include the torso and face of a human. The encrypted portion may correspond to the face of the human. The process 600 may include extracting an encrypted encryption key used to encrypt the encrypted portion, an encrypted initialization vector, and coordinates for pixels which correspond to the encrypted portion from the metadata at 604. The process 600 may include decrypting the encrypted encryption key and the encrypted initialization vector using a private key of an asymmetrical encryption technique at 606. In embodiments, the private key corresponds to a public key used to initially encrypt the encryption key and the initialization vector. The process 600 may include decrypting the pixels for the encrypted portion using the encryption key and the initialization vector at 608. The process 600 may include writing the decrypted pixels back into the image at 610. By writing the decrypted pixels back into the image an image may be restored to a state that represents the state at which the image was captured (e.g., the image no longer includes encrypted portions or regions in the image).

FIG. 7 illustrates an example architecture for implementing a cryptographic protection feature, in accordance with at least one embodiment. In architecture 700, one or more users 702 (e.g., users, data scientists, etc.,) may utilize user computing devices 704(1)-(N) (collectively, user devices 704) to access a browser application 706 or a user interface (UI) accessible through the browser application 706, via one or more networks 708 to request decryption or encryption of content such as images or video. The "browser application" 706 can be any browser control or native application that can access and display a network page or other information such as a user interface of a native software application for enabling the viewing of interaction with content such as images or video. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706.

The user devices 704 may include at least one memory 710 and one or more processing units or processor(s) 712. The memory 710 may store program instructions that are loadable and executable on the processor(s) 712, as well as data generated during the execution of these programs. Depending on the configuration and type of the user devices 704, the memory 710 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 710 may include multiple different types of memory, such as static random access memory (SRAM), dynamic random access memory (DRAM), or ROM.

Turning to the contents of the memory 710 in more detail, the memory 710 may include an operating system and one or more application programs or services for implementing the features disclosed herein. Additionally, the memory 710 may include one or more modules for implementing the features described herein including the cryptographic protection module 730.

The architecture 700 may also include one or more service provider computers 714 that may, in some examples, provide computing resources such as, but not limited to, client entities, low latency data storage, durable data store, data access, management, virtualization, hosted computing environment or "cloud-based" solutions, electronic content performance management, etc. The service provider computers 714 may implement or be an example of the service provider computer(s) of FIGS. 2-6 or as described herein. The one or more service provider computers 714 may also be operable to provide site hosting, computer application development, and/or implementation platforms, combinations of the foregoing, or the like to the one or more users 702.

In some examples, the networks 708 may include any one or a combination of many different types of networks, such as cable networks, the Internet, wireless networks, cellular networks, and other private and/or public networks. While the illustrated examples represents the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 714 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another.

In one illustrative configuration, the one or more service provider computers 714 may include at least one memory 716 and one or more processing units or processor(s) 718. The processor(s) 718 may be implemented as appropriate in hardware, computer-executable instructions, firmware, or combination thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also contain communication connection interface(s) 722 that allow the one or more service provider computers 714 to communicate with a data store, another computing device or server, user terminals, and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the cryptographic protection module 730. In accordance with at least one embodiment, the cryptographic protection module 730 may be configured to at least receive or otherwise obtain images or video, implement an object detection algorithm(s) to detect one or more regions of interest (e.g., portions of an image which include personally identifiable information such as a face of a person, a license plate of a vehicle, etc.). The cryptographic protection module 730 may be configured to implement the object detection algorithm(s) which identify the coordinates within an image for the area of interest as well as the sequence of order of detection within the image which may be used to subsequently decrypt the regions of interest as described herein. In accordance with at least one embodiment, the cryptographic protection module 730 may be configured to implement a symmetric encryption technique or process, such as a cipher block, and generate an initialization vector, for encrypting the detection regions of interest in an image or video. The cryptographic protection module 730 may be configured to write the encrypted pixels of the regions of interest back into the image file or frame of the video. In embodiments, the cryptographic protection module 730 may be configured to encrypt the public key (encryption key) used in the symmetric encryption process and the initialization vector using an asymmetric technique or process. The private key which correspond to the public key used to encrypt the encryption key and the initialization vector may be stored separately and maintained securely from the image or video. The cryptographic protection module 730 may be configured to store the encrypted encryption key and initialization vector in metadata of the image or video such as by updating the metadata to write the information. In embodiments, the cryptographic protection module 730 and the server provider computers 714 may be configured to use the private key to decrypt the encryption key and the initialization vector which in turn can be used to decrypt the encrypted pixels of the one or more regions of interest.

Figure 8:
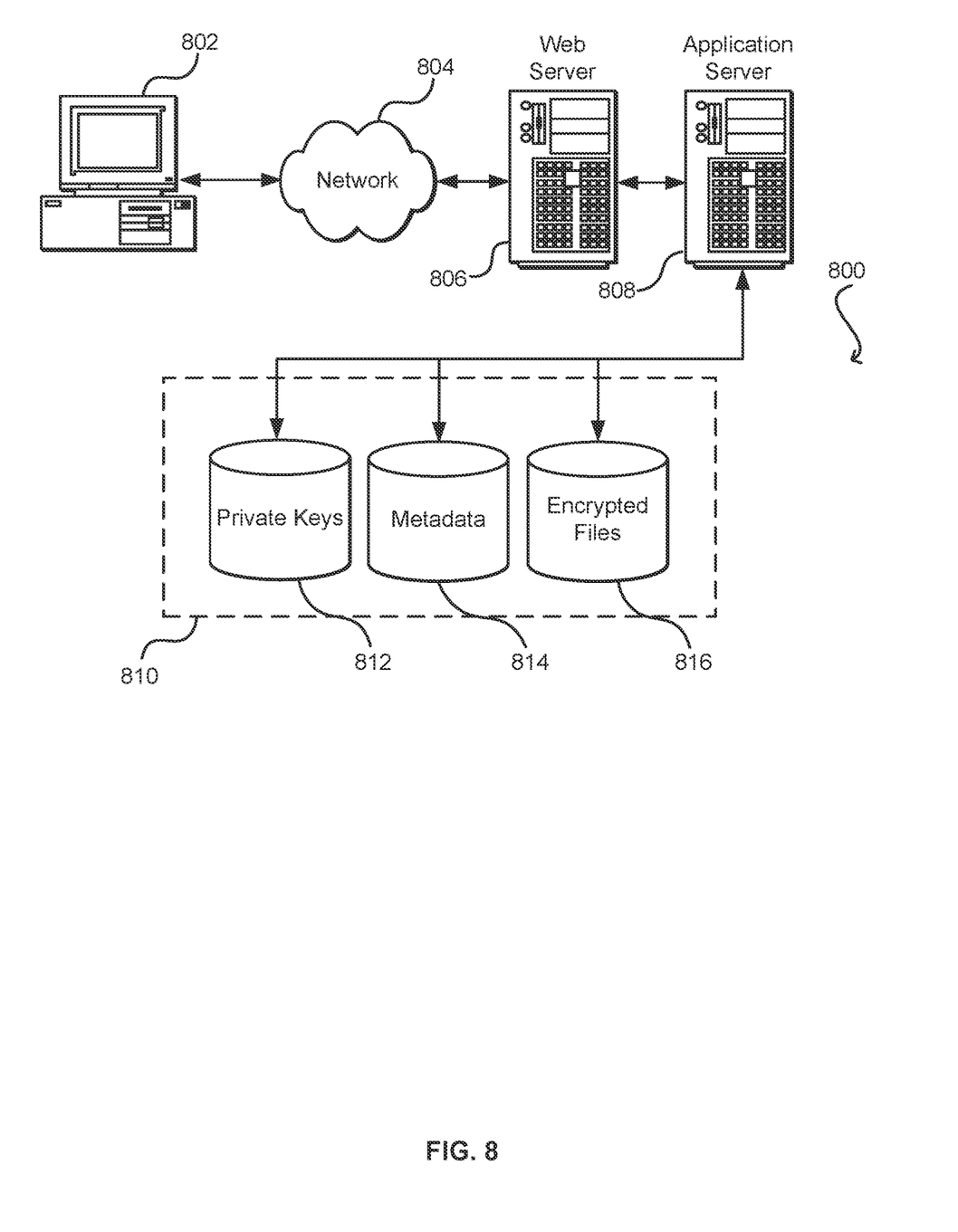
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing private keys 812 and encrypted files 816, which can be decrypt encrypted portions of files such as encrypted images, video, or media. The data store also is shown to include a mechanism for storing metadata 814, which are associated with the encrypted files and include symmetric keys used to encrypt the files stored in 816, and further include encrypted initialization vectors, coordinates for the encrypted portions in the image files, as well as an order of detection by a detection algorithm of the encrypted portions in the image. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a request to decrypt encrypted portions of an image or video. In this case, the data store might access user information to verify the identity of the user and can determine that the user is approved to access the private key of the asymmetric encryption process required to decrypt the encryption key of the symmetric encryption process thereby decrypting portions of an image and video for viewing raw images or video as captured by a device. The unencrypted images or video (raw footage or images) then can be returned to the user, such as in a user interface or a Web page that the user is able to view via a browser on the user device 802.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a computer system, an image captured by a camera associated with a vehicle;
   detecting, by the computer system, one or more regions in the image based at least in part on an object detection algorithm, wherein the object detection algorithm generates an order of detection for each region of the one or more regions in the image;
   encrypting, by the computer system, pixels for each region of the one or more regions using a block cipher symmetric encryption technique and an initialization vector;
   writing, by the computer system, the encrypted pixels for each region of the one or more regions back into the image;
   encrypting, by the computer system, a symmetric key of the block cipher symmetric encryption technique and the initialization vector using an asymmetric encryption technique; and
   updating, by the computer system, metadata of the image to store the encrypted symmetric key, the encrypted initialization vector, and the order of detection.

2. The computer-implemented method of claim 1, wherein the metadata further stores X and Y coordinates in the image for each region of the one or more regions.

3. The computer-implemented method of claim 1, further comprising transmitting, by the computer system, the metadata to a server computer.

4. A computer system comprising:
   a memory configured to store computer-executable instructions; and
   a processor in communication with the memory configured to execute the computer-executable instructions to at least:
      obtain an image;
      detect one or more regions in the image based at least in part on an object detection algorithm, wherein the object detection algorithm generates an order of detection for each region of the one or more regions in the image;
      encrypt pixels for each region of the one or more regions using a symmetric encryption technique and an initialization vector;
      write the encrypted pixels for each region of the one or more regions back into the image;

encrypt a symmetric key of the symmetric encryption technique and the initialization vector using an asymmetric encryption technique; and update metadata of the image to store the encrypted symmetric key, the encrypted initialization vector, and the order of detection.

5. The computer system of claim 4, wherein the symmetric encryption technique comprises a block cipher.

6. The computer system of claim 5, wherein the initialization vector is a randomly generated number that is used to seed the block cipher.

7. The computer system of claim 4, wherein a private key which corresponds to a public key used to encrypt the symmetric key is stored on another computer system.

8. The computer system of claim 4, wherein encrypting the pixels for each region of the one or more regions includes using the order of detection in response to identifying, by the objection detection algorithm, a portion of the one or more regions which overlap in the image.

9. The computer system of claim 4, wherein the object detection algorithm detects particular regions of the one or more regions based at least in part on a type of object detected in the image.

10. The computer system of claim 9, wherein encrypting the pixels for the particular regions includes using a particular symmetric encryption key and particular initialization vector.

11. The computer system of claim 10, wherein encrypting the particular symmetric encryption key and the particular initialization vector includes using a particular public key and private key pair for the asymmetric encryption technique.

12. A computer-implemented method, comprising:

receiving, by a computer system, an image and corresponding metadata for the image, the image including an encrypted portion, the encrypted portion being less than an entirety of the image;

extracting, by the computer system, an encrypted encryption key used to encrypt the encrypted portion, an encrypted initialization vector, and coordinates for pixels which correspond to the encrypted portion from the metadata;

decrypting, by the computer system, the encrypted encryption key and the encrypted initialization vector using a private key of an asymmetrical encryption technique, the private key corresponding to a public key used to initially encrypt the encryption key and the initialization vector, wherein the public key used to initially encrypt the encryption key, the initialization vector, and the corresponding private key used to decrypt the encryption key and the initialization vector are associated with a particular type of object detected in the image prior to being encrypted using the encryption key;

decrypting, by the computer system, the pixels for the encrypted portion using the encryption key and the initialization vector; and writing, by the computer system, the decrypted pixels back into the image.

13. The computer-implemented method of claim 12, wherein the image includes a plurality of encrypted portions, and wherein the encryption key is used to encrypt a portion of the plurality of encrypted portions.

14. The computer-implemented method of claim 12, wherein the image corresponds to a frame of a video.

15. The computer-implemented method of claim 14, further comprising receiving, by the computer system, a plurality of images and corresponding metadatas for the plurality of images, each image including one or more encrypted portions, and wherein each metadata of the metadatas indicates a sequence order for each image within the plurality of images.

* * * * *